United States Patent
Bott et al.

(10) Patent No.: US 9,796,534 B2
(45) Date of Patent: Oct. 24, 2017

(54) SENSOR DEVICE FOR PROVIDING AT LEAST ONE OPERATING PARAMETER OF AN OSCILLATING CONVEYOR, AND OSCILLATING CONVEYOR

(71) Applicant: Afag Holding AG, Hergiswil (CH)

(72) Inventors: Klaus Bott, Altdorf (DE); Izudin Mesan, Nürnberg (DE); Sebastian Mojrzisch, Hannover (DE); Jens Twiefel, Hannover (DE); Jorg Wallascheck, Hannover (DE)

(73) Assignee: AFAG HOLDING AG, Hergiswil (CH)

( * ) Notice: Subject to any disclaimer, the term of this patent is extended or adjusted under 35 U.S.C. 154(b) by 0 days.

(21) Appl. No.: 15/047,799

(22) Filed: Feb. 19, 2016

(65) Prior Publication Data

US 2016/0244266 A1 Aug. 25, 2016

(30) Foreign Application Priority Data

Feb. 19, 2015 (DE) .......................... 10 2015 102 384

(51) Int. Cl.
*B65G 27/32* (2006.01)
*B65G 27/10* (2006.01)
(Continued)

(52) U.S. Cl.
CPC ............... *B65G 27/32* (2013.01); *G01H 1/00* (2013.01); *G01H 3/04* (2013.01); *G01H 3/10* (2013.01);
(Continued)

(58) Field of Classification Search
None
See application file for complete search history.

(56) References Cited

U.S. PATENT DOCUMENTS 6,047,329 A * 4/2000 Horikawa ........... H04L 12/4608
370/396
6,074,329 A * 6/2000 Hirano ............. G05B 19/41815
198/346.1
(Continued)

FOREIGN PATENT DOCUMENTS

DE 4142398 A1 6/1993
DE 19741524 A1 3/1999
(Continued)

OTHER PUBLICATIONS

Canadian Search Report from corresponding CA Application No. 2,918,433, dated Nov. 22, 2016 (4 pages).
(Continued)

*Primary Examiner* — Kavel Singh
(74) *Attorney, Agent, or Firm* — Lucas & Mercanti, LLP (57) ABSTRACT

A sensor device which is used to provide a control device with at least one operating parameter of an oscillating conveyor, the control device being used to control a drive device for exciting oscillation of an oscillating rail on the basis of the operating parameter, the sensor device including at least one sensor element for recording the operating parameter or at least one measured value from which the operating parameter can be determined, the sensor device including at least one communication device for wirelessly transmitting the operating parameter to the control device and an energy supply device for supplying the sensor device with operating energy, the energy supply device being used to convert a vibration generated by the drive device and/or electromagnetic radiation into the operating energy.

13 Claims, 3 Drawing Sheets

(51) Int. Cl.

| | | |
|---|---|---|
| *B65G 27/00* | (2006.01) | |
| *G01H 1/00* | (2006.01) | |
| *G01H 3/04* | (2006.01) | |
| *G01H 3/10* | (2006.01) | |
| *G01H 11/08* | (2006.01) | |
| *H02J 50/00* | (2016.01) | |
| *G01P 15/09* | (2006.01) | |
| *H02K 35/02* | (2006.01) | |
| *H02N 2/18* | (2006.01) | |

(52) U.S. Cl.
CPC ............. *G01H 11/08* (2013.01); *G01P 15/09* (2013.01); *H02J 50/00* (2016.02); *H02K 35/02* (2013.01); *H02N 2/181* (2013.01); *H02N 2/183* (2013.01)

(56) References Cited

U.S. PATENT DOCUMENTS

| | | | |
|---|---|---|---|
| 6,079,549 A | 6/2000 | Meitinger | |
| 6,259,372 B1 | 7/2001 | Taranowski et al. | |
| 6,357,579 B1 * | 3/2002 | Patterson | B65G 27/24 198/760 |
| 6,986,418 B2 * | 1/2006 | Swinderman | B65G 45/12 198/497 |
| 7,005,778 B2 | 2/2006 | Pistor | |
| 7,756,603 B1 * | 7/2010 | Delaney, III | H01R 4/2404 198/459.8 |
| 7,777,623 B2 | 8/2010 | Albsmeier et al. | |
| 2011/0074162 A1 | 3/2011 | Cottone et al. | |
| 2014/0343722 A1 | 11/2014 | Nancarrow et al. | |

FOREIGN PATENT DOCUMENTS

| | | |
|---|---|---|
| DE | 10150128 A1 | 4/2003 |
| EP | 1201572 A1 | 5/2002 |
| EP | 2698609 A1 | 2/2014 |
| WO | 2005036728 A2 | 4/2005 |
| WO | WO2012071198 | 5/2012 |
| WO | WO2012122597 | 9/2012 |

OTHER PUBLICATIONS

European Search Report from corresponding EP Application No. 15 20 0880, dated Jul. 7, 2016 (8 pages).

* cited by examiner

SENSOR DEVICE FOR PROVIDING AT LEAST ONE OPERATING PARAMETER OF AN OSCILLATING CONVEYOR, AND OSCILLATING CONVEYOR

CROSS-REFERENCE TO RELATED APPLICATIONS

The present application claims priority of DE 10 2015 102 384.9, filed Feb. 19, 2015, the priority of this application is hereby claimed and this application is incorporated herein by reference.

BACKGROUND OF THE INVENTION

The invention relates to a sensor device which is used to provide a control device with at least one operating parameter of an oscillating conveyor, the control device being used to control a drive device for exciting oscillations of an oscillating rail on the basis of the operating parameter, the sensor device comprising at least one sensor element for recording the operating parameter or at least one measured value from which the operating parameter can be determined. The invention also relates to an oscillating conveyor.

Oscillating conveyors are used, for example, to supply small parts or components in automated manufacturing processes and to transport bulk material. An oscillating rail of the oscillating conveyor is excited by a drive device to perform an ellipsoidal oscillation or shaking movement which conveys the material to be conveyed along a predefined path. The oscillation of the oscillating rail can be excited by controlling an electromagnet in such a manner that it periodically attracts an armature connected to the oscillating rail. The oscillating rail can be mounted by means of leaf springs.

In order to operate the oscillating conveyor in an energy-efficient manner, that is to say in order to achieve large oscillation amplitudes even when using low excitation energies, it is advantageous to operate the oscillating conveyor at or close to the resonant frequency of the spring-mounted oscillating rail. Large oscillation amplitudes are advantageous since the oscillation amplitude is related to the conveying capacity. In addition, the intention is to achieve a constant oscillation amplitude since this is a prerequisite for a constant conveying capacity.

In order to achieve a large and stable oscillation amplitude, it is known practice to use sensors which record operating parameters of the oscillating conveyor.

The document DE 19 741 524 A1 discloses an oscillating conveyor which comprises an optical sensor which monitors the oscillation amplitude. The drive of the oscillating conveyor is regulated on the basis of the recorded oscillation amplitude.

The problem in this case is that corresponding sensors have to be supplied with energy, on the one hand, and the signals from the sensors have to be guided to the drive device or to a control device assigned to the drive devices, on the other hand. Cabling of the sensor can be complicated and susceptible to faults, in particular when the intention is to connect a corresponding sensor to the vibrating oscillating rail.

SUMMARY OF THE INVENTION

The invention is therefore based on the object of specifying a sensor device which is improved in comparison therewith.

The object is achieved, according to the invention, by specifying a sensor device of the type mentioned at the outset which comprises at least one communication device for wirelessly transmitting the operating parameter to the control device and an energy supply device for supplying the sensor device with operating energy, the energy supply device being used to convert a vibration or electromagnetic radiation generated by the drive device into the operating energy.

The invention proposes a sensor device which manages to supply energy and to transmit measured values or the operating parameter in an oscillating conveyor without cabling of the sensor device. This is achieved, on the one hand, by the operating parameter being wirelessly transmitted from the sensor device to the control device. However, wireless transmission of information requires a certain amount of energy to transmit the information, with the result that it is necessary to supply energy to the sensor device even if purely passive sensors are used. An energy supply could be achieved, in principle, by means of batteries or rechargeable batteries in the sensor device. In this case, however, it would be necessary to regularly recharge the rechargeable batteries or change the batteries, which would considerably increase the maintenance effort, in particular when using oscillating conveyors with a multiplicity of sensor devices. Therefore, the invention proposes obtaining the energy for operating the sensor device from the energy provided by the drive device by converting the generated vibrations and/or the electromagnetic radiation emitted by the drive device into the operating energy. A wireless sensor device which is substantially maintenance-free can therefore be provided for oscillating conveyors.

The sensor device according to the invention can be directly arranged on the oscillating rail. For example, the sensor device may be arranged on the underside or in the lateral region of the oscillating rail. The sensor device can be fastened to the oscillating rail by means of one or more fastening elements, for example by means of screwing or clamping.

It is possible for the energy supply device to comprise an oscillating element, which can be caused to oscillate by means of vibrations in the event of mechanical contact between the sensor device and the oscillating conveyor, and a rectifying circuit, an AC voltage being provided when the oscillating element oscillates, and the rectifying circuit being used to provide the operating energy by rectifying the AC voltage. The sensor device can be advantageously in mechanical contact with the oscillating rail or a mounting element mounting the oscillating rail, for example a leaf spring. In this case, the oscillations of the oscillating rail or of the mounting element cause the oscillating element to oscillate. The oscillating element may be simultaneously used as a sensor element, in particular as an acceleration sensor. However, it is advantageously separate from the sensor element since the technical demands imposed on the oscillating element and on an acceleration sensor differ. The oscillating element is intended to enable the highest possible energy production efficiency, but a high degree of accuracy of the measured values is required in a sensor.

The rectifying circuit may be in the form of a full bridge or a half-bridge. It is possible to use a passive rectifying circuit which is constructed from diodes, for example. Alternatively or additionally, electrical switches switched in a clocked manner, for example transistors, can be used. It is possible for the rectified voltage to be smoothed, for example by means of a capacitor. It is possible to provide an energy storage device for buffering the operating energy, for example a battery, a goldcap or a supercapacitor. This energy storage device may have small dimensions since it is used only to stabilize the energy supply for the sensor device and does not have to permanently supply the sensor device with energy.

The oscillating element may be a piezoelectric element or may comprise at least one piezoelectric element, the piezoelectric element being deformed when the oscillating element oscillates. During the oscillation, the piezoelectric element can be compressed, stretched or caused to perform bending oscillations, for example. When the piezoelectric element is deformed by the oscillation, the AC voltage can be directly tapped off at the piezoelectric element and can then be rectified.

It is possible for the piezoelectric element to couple a counterweight, which is movable at least in one direction with respect to the sensor device, to a fastening point which is stationary with respect to the sensor device. For example, the oscillating element can be constructed in a manner corresponding to a piezoelectric element-based acceleration sensor in which a voltage is output on the basis of an acceleration acting on the acceleration sensor. In contrast to acceleration sensors which, in so far as they are based on the piezoelectric effect, typically use piezoelectric monocrystals to achieve a high degree of accuracy, a polycrystalline piezoelectric element is preferably used for the piezoelectric element of the oscillating element, thus making it possible to achieve a higher efficiency.

The oscillating element may be a bending transducer, in particular. A bending transducer may preferably comprise an element made of a multilayer material as the element which is bent during the oscillation, at least one of the layers being a layer made of a piezoceramic. The element may be a monomorph in which a piezoceramic is applied to a carrier material or a bimorph having two piezoelectric layers which are braced with respect to one another during bending. The bending transducer may be fastened, on one side, to a stationary fastening point of the sensor device. The other side may oscillate freely or may be connected to a counterweight which is movable with respect to the sensor device.

The resonant frequency of the bending transducer can be selected in such a manner that it is substantially equal to the resonant frequency or a desired drive frequency of the oscillating conveyor. In this case, the bending transducer is particularly sensitive in that frequency range in which it is typically operated during operation of the oscillating transducer.

In an alternative embodiment, it is possible for the oscillating element to comprise a permanent magnet which is movably mounted with respect to a coil, the AC voltage being dropped across the coil when the permanent magnet oscillates. The magnetic flux through the coil changes if the position of the permanent magnet with respect to the coil is changed, thus inducing an AC voltage in the coil which can be used to supply energy to the sensor device.

As explained at the outset, the electromagnetic radiation generated by the drive device can be additionally or alternatively used to provide the operating energy. It is possible for the energy supply device to comprise a receiving antenna for the electromagnetic radiation and a rectifying circuit for providing the operating energy from a reception signal from the receiving antenna. The rectification can be identical to the rectifying circuit described in connection with the oscillating element. A coil can be used as the receiving antenna. The receiving antenna can preferably be tuned in such a manner that it has maximum sensitivity in the range of the resonant frequency or the desired operating frequency of the oscillating conveyor or an integer multiple of this respective frequency.

The operating parameter may relate to an oscillation of an oscillating rail of the oscillating conveyor. In particular, the operating parameter may describe a location and/or a speed and/or an acceleration of the oscillating rail. It is also possible for the operating parameter to describe an amplitude and/or a phase, in particular with respect to a phase of the drive, and/or a frequency of an oscillation of the oscillating rail. An instantaneous value for said variables and/or a temporal profile and/or a maximum and/or a mean value can be determined as operating parameters. Maxima, mean values and the like may each be determined for one or more oscillation periods.

It is also possible for the sensor device to additionally or alternatively record other parameters of the oscillating conveyor, for example a temperature of the ambient air or of individual components of the oscillating conveyor, a filling level and/or a filling mass of the oscillating rail and/or the position of parts transported on the oscillating rail. Any type of sensor known in the prior art can be used as part of the sensor device according to the invention. For example, it is possible to use location sensors, speed sensors, acceleration sensors, force sensors, weight sensors, optical sensors and/or acoustic sensors.

If the sensor element records at least one measured value, the sensor device may comprise a processing device for determining the operating parameter from the measured value, the processing device being designed to control the communication device to transmit the respectively determined operating parameter at predefined intervals or at intervals dependent on the measured value. Wireless data transmission is relatively energy-intensive. Therefore, it is advantageous if data are not transmitted from the sensor device to the control device continuously but rather by means of transmissions which are spaced apart from one another in terms of time. In particular, an operating parameter can be respectively transmitted after an oscillation cycle or after a predefined number of oscillation cycles. It is possible for fixed intervals of time to be predefined, according to which the operating parameter is respectively transmitted, but it is also possible for the processing device to detect concluded oscillation cycles and to carry out transmission after a particular oscillation phase has been reached and/or after a particular number of oscillation cycles have been concluded, for example.

A temporal profile of the measured value or of a value determined from the measured value for a predefined interval of time or for an interval of time determined from the measured values can also be transmitted as the operating parameter. It is possible for measured values for one of the oscillation cycles to be respectively transmitted after a predefined number of oscillation cycles. In this case, it is advantageous if data relating to an interval of time which extends somewhat beyond the oscillation cycle are transmitted in order to concomitantly map the "edges" of the oscillation cycle and therefore make it possible to more easily process the data further.

If a temporal profile of the acceleration during an oscillation cycle were transmitted as the operating parameter, for example, and if the acceleration values were recorded at a sensor rate of 10 kHz, 10,000 measured values per second would have to be transmitted to the control device when transmitting all measured values. However, if data are transmitted only for each one hundredth oscillation cycle, for example, the volume of data to be transmitted can be reduced to 100 measured values per second. The amount of operating energy needed to transmit the data can be considerably reduced.

The sensor device may comprise at least one converter device for subjecting the measured value or the operating parameter to analog/digital conversion, the communication device being designed to digitally transmit the operating parameter. The operating parameter can be digitally transmitted using known protocols, for example Bluetooth® or WLAN. However, the transmission can also be carried out without using a superordinate protocol, for example by means of digital phase or amplitude modulation of a carrier signal. It is possible for a unique item of identification information for the sensor device to be transmitted in addition to the operating parameter. In this case, a plurality of sensor devices can be used in an oscillating conveyor or an industrial installation without any problems since it is always possible to identify which of the sensor devices provides the transmitted operating parameters. It is also possible to transmit the operating parameter and/or the identification information in encrypted form. In this case, the operation of the oscillating conveyor is protected against manipulation and inadvertently transmitted information.

In addition to the sensor device according to the invention, the invention relates to an oscillating conveyor comprising an oscillating rail, a drive device for exciting an oscillation of the oscillating rail and a control device for controlling the drive device, the oscillating conveyor comprising a sensor device according to the invention, and the control device being used to control the drive device on the basis of the operating parameter wirelessly transmitted by the sensor device. The sensor device has at least one sensor element for recording the operating parameter or at least one measured value from which the operating parameter can be determined. In addition, the sensor device comprises at least one communication device for wirelessly transmitting the operating parameter to the control device and an energy supply device for supplying the sensor device with operating energy. The energy supply device is used to convert a vibration and/or electromagnetic radiation generated by the drive device into the operating energy. Possible developments of the sensor device can be gathered from the preceding description. The sensor device can be mechanically coupled, in particular, to the oscillating rail or to a mounting element mounting the oscillating rail. Coupling can be carried out, for example, by screwing or clamping the sensor device to the oscillating rail or to the mounting element.

The operating parameter may relate to a phase and/or an amplitude and/or a frequency of the oscillating rail, the sensor device, the control device and the drive device being able to form a control loop for regulating the phase and/or the amplitude and/or the frequency of the oscillation to a predefined value. The oscillation is preferably regulated in such a manner that a frequency of the oscillation is close to the resonant frequency of the oscillating rail mounted by means of the mounting elements.

Alternatively, it is possible for the control device to be designed to provide the operating parameter as a control signal for the drive device with a predefined time delay. If the operating parameter is an acceleration or a speed of the oscillating rail, this corresponds to feedback of the oscillation of the oscillating rail to the drive of the oscillating rail. Adapting the time delay and therefore the phase shift between the feedback signal and the oscillation of the oscillating rail makes it possible to operate the oscillating conveyor in a stable manner at or close to its resonance.

A feedback signal phase-shifted through 90° with respect to a location signal for the oscillating rail would correspond to operation of the oscillating conveyor at the resonant frequency. Smaller phase shifts shift the oscillation frequency of the oscillating conveyor to lower frequencies and vice versa. If the oscillation of the oscillating rail is approximately considered to be a harmonic oscillation, a measurement signal for the speed of the oscillating rail is shifted through 90° with respect to a measurement signal for the location and a measurement signal for the acceleration is shifted through 180°. Therefore, an operating parameter which describes an instantaneous acceleration or an instantaneous speed of the oscillating rail can also be fed back by means of a corresponding time delay, that is to say by means of a corresponding phase delay, in order to make it possible to operate the oscillating conveyor at the resonant frequency or close to the resonant frequency.

The drive device may comprise a coil, an armature being arranged on the oscillating rail, which armature is attracted by the coil when the coil is energized, the control device being designed to energize the coil on the basis of the operating parameter. Coils generate strong electromagnetic stray fields, which is why, as explained above, the electromagnetic radiation emitted by the drive device or by the coils can be used to supply energy to the sensor device in addition or as an alternative to the vibrations.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
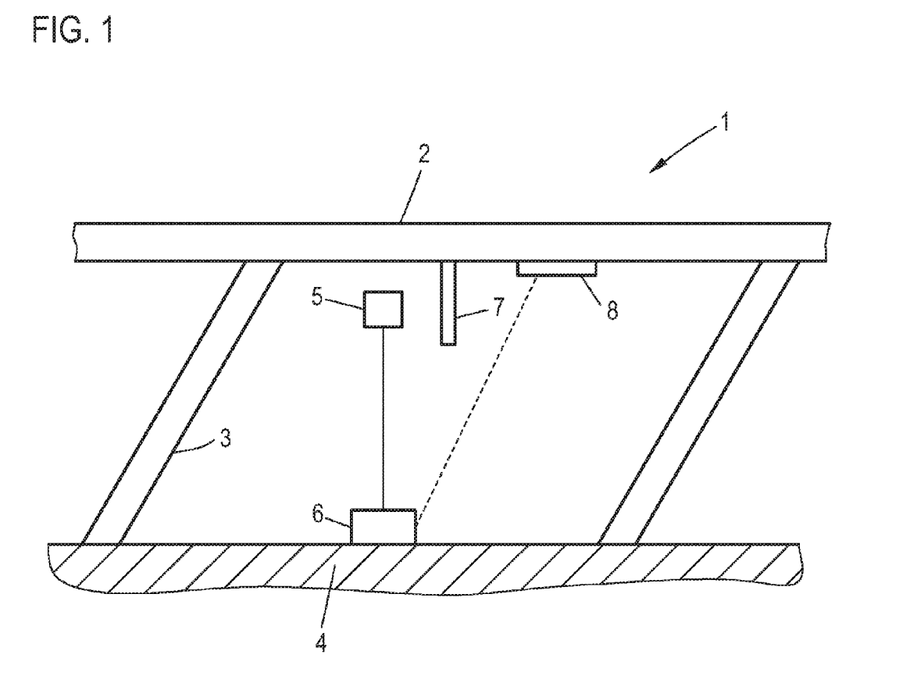
FIG. 1 schematically shows an exemplary embodiment of an oscillating conveyor according to the invention, FIG. 2 schematically shows an exemplary embodiment of a sensor device according to the invention, FIGS. 3 to 6 schematically show detailed views of oscillating elements of different exemplary embodiments of sensor devices according to the invention, and FIGS. 7 and 8 schematically show control devices of different exemplary embodiments of oscillating conveyors according to the invention.

FIG. 1 shows an oscillating conveyor 1 which is designed to transport objects along the oscillating rail 2 by means of an oscillation of the oscillating rail 2. The oscillating rail 2 is fastened to a base plate 4 by means of leaf springs 3. The oscillating rail 2 is caused to oscillate by a drive device 5. For this purpose, the drive device 5 comprises at least one coil, by means of which an armature 7 arranged on the oscillating rail 2 is attracted when the coil is energized. If the energization of the coil is interrupted, the oscillating rail 2 is moved away from the coil again by the leaf springs 3. Periodic energization of the coil can therefore cause the oscillating rail 2 to oscillate.

In order to make it possible to efficiently operate the oscillating conveyor 1, it is advantageous if the oscillating rail 2 is operated at or in the vicinity of the resonant frequency of the oscillating rail 2. Corresponding control of the drive device 5 and corresponding energization of the coil are carried out by the control device 6. The problem here is that the resonant frequency of the oscillating rail 2 depends on a multiplicity of factors which can sometimes also change during operation of the oscillating conveyor 1, for example the temperature of the components of the oscillating conveyor 1. In order to make it possible to reliably operate the oscillating conveyor 1 at or in the vicinity of the resonant frequency of the oscillating rail 2, the oscillating conveyor 1 therefore additionally comprises a sensor device 8 which is designed to record an operating parameter of the oscillating conveyor 1 and to wirelessly transmit it to the control device 6. A temporal profile of the acceleration of the oscillating rail 2 is transmitted as the operating parameter. Alternatively or additionally, further parameters which describe the oscillation of the oscillating rail 2 could be transmitted as operating parameters, for example a location and/or a speed of the sensor device 8 or an oscillation amplitude and/or phase and/or frequency. In an alternative embodiment, it would also be possible for a local temperature in the region of the sensor device, a filling level, for example an optically recorded filling level, of the oscillating rail and/or a filling mass and/or a position of parts transported by the oscillating conveyor to be additionally or alternatively recorded as operating parameters and wirelessly transmitted to the control device 6.

In order to make it possible to operate the sensor device 8 in a completely wireless manner, the sensor device comprises an energy supply device (not illustrated) for supplying the sensor device 8 with operating energy, the energy supply device being used to convert a vibration generated by the drive device 5 into the operating energy. In alternative embodiments, it would be possible for electromagnetic radiation provided by the drive device 5 to be additionally or alternatively converted into the operating energy.

Figure 2:
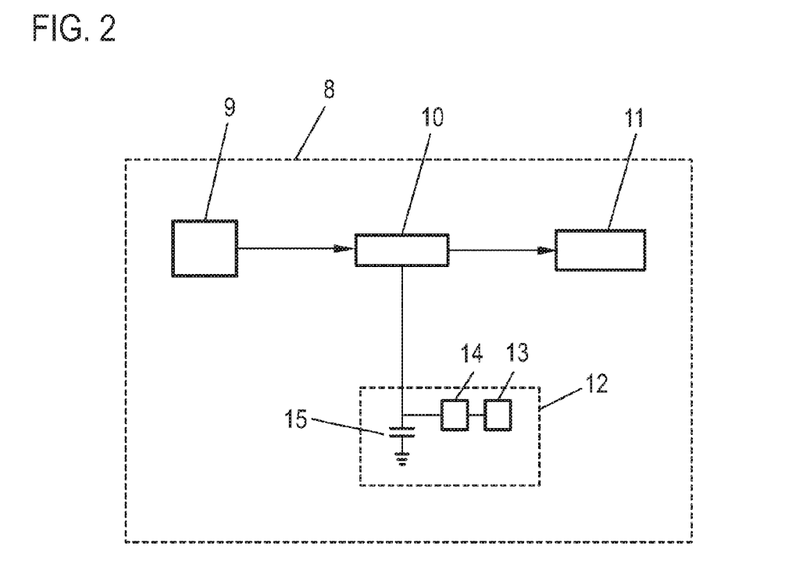

FIG. 2 schematically shows the structure of the sensor device 8. The sensor device 8 comprises a sensor element 9, a processing device 10 and a communication device 11 as well as the energy supply device 12 which supplies the further components of the sensor device 8 with energy if required. The sensor device 9 is an acceleration sensor which provides an output voltage which describes an acceleration acting on the sensor element 9 and therefore on the sensor device 8. Corresponding acceleration sensors are known in the prior art and shall not be discussed in detail. For example, it is possible to use an acceleration sensor which comprises a piezoelectric element arranged between the housing of the sensor device and a counterweight. If an acceleration acts on the sensor element, a voltage which describes this acceleration can be tapped off at this piezoelectric element. Acceleration sensors often do not require an energy supply, with the result that FIG. 2 does not show a connection between the sensor element and the energy supply device 12. If an active sensor element which requires an energy supply is used, this can also be supplied with energy by the energy supply device 12. In alternative embodiments of the sensor device 8, it is also possible to use other sensors, for example temperature sensors, speed sensors or the like, to provide measured values or operating parameters.

The processing device 10 digitizes the measured values provided by the sensor device 9, uses them to determine an operating parameter to be transmitted and controls the communication device 11 to transmit this operating parameter to the control device 6. In a first embodiment, the processing device 10 periodically records the measured value provided by the sensor device 9, scales it or provides it with an offset under certain circumstances in order to take into account predefined calibration data for the sensor element 9, for example, and the communication device 11 is controlled to transmit this measured value as the operating parameter.

For this purpose, the operating parameter is linked to an item of identification information which uniquely identifies the sensor device 8. This makes it possible to use a plurality of sensor devices 8 and to nevertheless always determine which of the sensor devices 8 provides a measured value. A plurality of sensor devices may therefore be used in an oscillating conveyor 1 in order to measure an acceleration in a plurality of regions of the oscillating conveyor 1, and further sensor devices may be provided in order to determine operating temperatures, filling levels or the like, for example, and to transmit them to the control device 6. The operating parameter can be transmitted by means of standard protocols, for example according to the WLAN standard or using Bluetooth®. It is also possible to use wireless communication protocols within the scope of industrial installation control. Alternatively, it would be possible to use a proprietary communication protocol, in which case data can be transmitted by means of digital amplitude and/or phase modulation, for example. The operating parameter is preferably transmitted to the control device 6 in encrypted form, thus making it possible to prevent inadvertent or deliberate disruption of the operation of the oscillating conveyor 1 by other communication devices.

The transmission of the operating parameter by the communication device 11 is energy-intensive, which is why it is desirable to reduce the transmitted volume of data. This is achieved in an alternative embodiment by not transmitting each individual measured value as the operating parameter. A temporal profile of the measured values which was recorded during an oscillation period or during part of the oscillation period of the oscillating rail 2 is respectively transmitted as the operating parameter.

In order to further reduce the energy requirement of the communication device 11, it is possible to transmit a correspondingly temporal profile only for every third oscillation period, for example, rather than for each oscillation period. In order to achieve this, the processing device 10 is designed to determine individual oscillation periods of the oscillating rail 2. Oscillation periods can be detected by means of periodic acceleration patterns. The processing device 10 then combines the measured values from one of these oscillation cycles to form the operating parameter, in which case some additional measured values before the start of the respective oscillation interval and after the end of the respective oscillation interval are advantageously additionally concomitantly taken into account in order to facilitate subsequent further processing of the measurement data by the control device 6. The operating parameter therefore represents a temporal sequence of measured values which describe accelerations in an interval of time which is somewhat longer than one oscillation period of the oscillating rail 2. This operating parameter is then transmitted to the control device 6 via the communication device 11, as explained above. As a result of individual oscillation periods being detected by the processing device 10, it is easily possible to carry out corresponding transmission only after a plurality of oscillation periods in each case.

Alternatively, the processing device 10 could respectively record measurement data within a predefined first interval of time and could transmit said data individually or in combination to the control device and could then not carry out transmission for a second predefined interval of time in each case. If the oscillating conveyor 1 is intended to be controlled as of a frequency of 10 Hz, for example, it is sufficient to respectively record the measured values for an interval of 200 ms, thus ensuring that this measurement interval comprises at least one oscillation period. The recording or transmission of the measurement data can then be interrupted for one second, for example.

In another alternative embodiment of the sensor device 8, the processing device 10 may be designed to use the measured values to calculate at least one operating parameter which describes oscillation in the form of oscillation parameters such as an oscillation amplitude, an oscillation frequency and/or an oscillation phase and to transmit this to the control device 6 as the operating parameter. An oscillation frequency can be determined by determining an oscillation period, as explained above.

An oscillation amplitude can be determined, for example, by determining a maximum value of the acceleration during one or more oscillation amplitudes since the maximum acceleration during an oscillation is correlated with the oscillation amplitude. Phase information can be transmitted in absolute form, for example by virtue of a trigger signal being transmitted to the control device via the communication device in the event of a zero crossing at a positive edge of the acceleration. The phase angle relative to a drive phase can then be determined in the control device.

Alternatively, it would be possible, for example, to receive electromagnetic radiation emitted by the drive device 5 using a receiving antenna and to determine a relative phase between the phase of the oscillation of the oscillating rail 2 and the phase of an energization signal for a coil of the drive device 5 from a relative phase angle between the received electromagnetic radiation and the acceleration signal and to transmit this to the control device 6 as the operating parameter.

The energy supply device 12 supplies energy to the sensor device 8, in particular the processing device 10 and the communication device 11. The energy supply device 12 comprises an oscillating element 13, which can be caused to oscillate by means of vibration in the event of mechanical contact between the sensor device 8 and the oscillating conveyor 1, and a rectifying circuit 14. An AC voltage is provided when the oscillating element 13 oscillates and the rectifying circuit 14 rectifies this AC voltage and provides the operating energy for the sensor device 8.

An energy storage element 15 may be additionally provided, as illustrated in FIG. 2, in order to stabilize the energy supply. The energy storage element 15 may be a capacitor which smoothes a voltage provided by the rectifying circuit 14. However, it would alternatively be possible to use a battery, a supercapacitor or the like to make it possible to supply energy to the sensor device 8 even when no energy can be obtained from an oscillation in the short term. The capacity of the energy storage device 15 can be selected to be small since the sensor device 8 is supplied with energy during operation of the oscillating conveyor 1 by virtue of generated vibrations being converted into operating energy.

The rectifying circuit 14 may be in the form of a full bridge or a half-bridge. The rectification can be carried out in a purely passive manner, for example by means of diodes, or in an active manner, for example by means of accordingly clocked electrical switches, for example by means of transistors. Different possible designs for the oscillating element 13 are explained in the further text with reference to FIGS. 3 to 6.

In an alternative embodiment of the sensor device 8, it would be possible to provide a receiving antenna for electromagnetic radiation emitted by the drive device 5 in addition or as an alternative to the oscillating element 13. If the oscillating conveyor 1 is driven, as illustrated in FIG. 1, by virtue of a yoke 7 being attracted by a coil in the drive device 5, relatively strong electromagnetic alternating fields are emitted by the coil. These fields can be received by the receiving antenna. Operating energy for the sensor device 8 can be provided by means of subsequent rectification.

Figure 3:
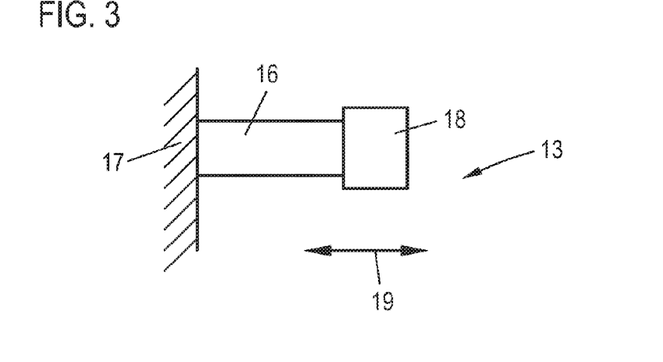

FIG. 3 shows a possible design of the oscillating element 13. A piezoelectric element 16 is arranged between a fastening point on the housing 17 of the sensor device 8 and a counterweight 18. If the sensor device 8 oscillates in the direction shown by arrow 19, the piezoelectric element 16 is deformed, that is to say compressed or expanded, on account of the mass inertia of the counterweight 18. If an accordingly structured piezoelectric element, for example a stack piezo, is used, a voltage which scales with the expansion or compression of the piezoelectric element 16 can be tapped off at the piezoelectric element 16. If the sensor element 8 oscillates and therefore there is a relative oscillation of the counterweight 18 with respect to the wall 17 of the sensor element 8, the piezoelectric element 16 therefore provides an AC voltage which can be rectified by the rectifying circuit 14 in order to provide the energy. With respect to its structure, the oscillating element 13 illustrated in FIG. 3 corresponds substantially to an acceleration sensor based on a piezoelectric element. However, whereas it is advantageous to use monocrystals as the piezoelectric element in acceleration sensors in order to achieve a high measurement accuracy, it is advantageous to use a polycrystalline piezoelectric element 16 for the oscillating element in order to achieve a high energy yield.

Figure 4:
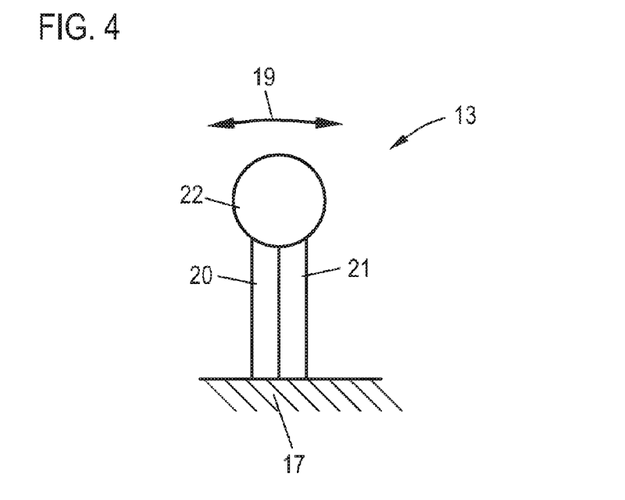
Figure 5:
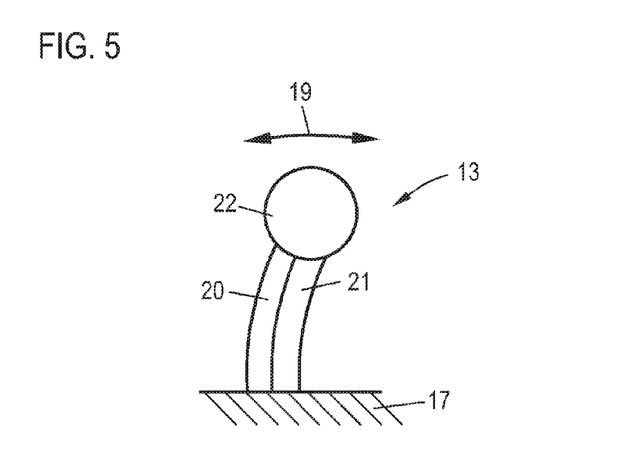

The oscillating conveyor 1 is typically intended to be operated at or close to its resonant frequency. The energy yield of the energy supply device can be improved further if the oscillating element is designed in such a manner that it has a resonant frequency which corresponds substantially to the resonant frequency of the oscillating conveyor 1, with the result that the oscillating element 13 oscillates at resonance during normal operation of the oscillating conveyor 1. It is possible to make particularly good use of this resonance condition if a bending transducer, as shown in FIGS. 4 and 5, is used as the oscillating element. FIG. 4 shows the bending transducer in the relaxed state and FIG. 5 illustrates a bent state of the bending transducer. The bending transducer comprises a counterweight 22 which can oscillate with respect to the wall of the sensor device 17 in the direction of the arrow 19. A bimorph which is constructed from two piezoelectric elements 20, 21 is arranged between the counterweight 22 and the wall 17. If the bending transducer illustrated in FIG. 5 is bent on account of the inertia of the counterweight 22 during an oscillation of the sensor device 8 in the direction of the arrow 19, the piezoelectric element 21 is compressed and the piezoelectric element 20 is stretched. Voltages which are opposite one another are therefore dropped across the piezoelectric elements 20, 21, which voltages can be added by means of a corresponding connection of the piezoelectric elements 20, 21 and can be supplied to the rectifier 14.

In addition to the piezoelectric elements 20, 21, the bending transducer may comprise one or more carrying layers (not illustrated). In an alternative embodiment, it would be possible to use only one piezoelectric element 20 or 21 and to apply it to a carrier material, for example to a plastic strip. In this case, only one piezoelectric layer would be compressed or expanded and the voltage dropped across this piezoelectric layer would be supplied to the rectifying circuit 14.

Figure 6:
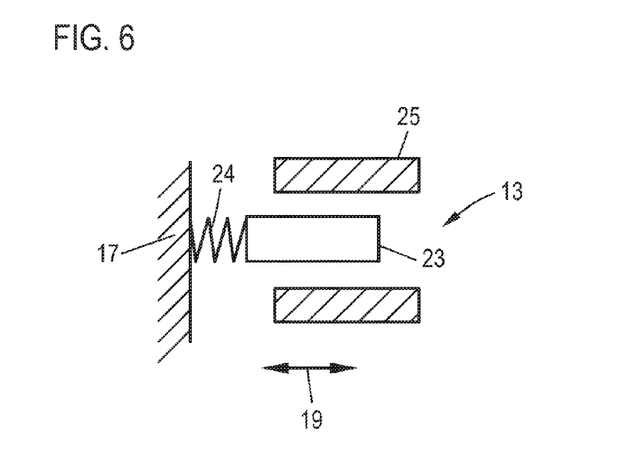

FIG. 6 shows another alternative oscillating element 13 in which, instead of a piezoelectric effect, electromagnetic induction in a coil 25 is used to provide the AC voltage for the rectifying circuit 14. A permanent magnet 23 is mounted on the wall 17 of the sensor device 8 using an elastic element 24. If the sensor device 8 oscillates in the direction of the arrow 19, the permanent magnet 23 moves with respect to a coil 25 which is stationary with respect to the sensor device 8. The magnetic flux through the coil 25 therefore changes and an AC voltage is induced in the coil 25 and can be supplied to the rectifying circuit 14.

Figure 7:
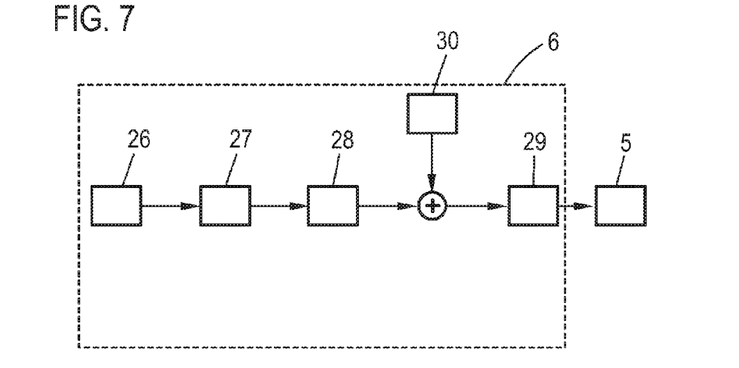
Figure 8:
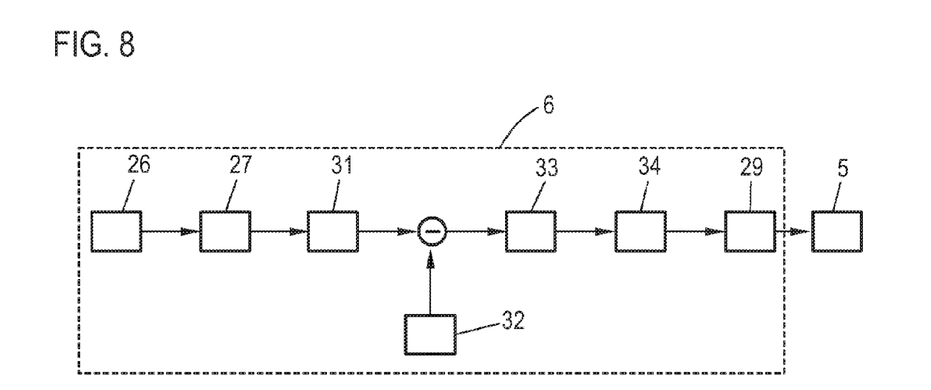

FIGS. 7 and 8 show two possible designs of the control device 6 of the oscillating conveyor 1. The control device 6 in FIG. 7 is designed in such a manner that it makes it possible to operate the oscillating conveyor at or close to the resonant frequency when the sensor device 8 provides the instantaneous acceleration or the instantaneous speed as the operating parameter. The wirelessly transmitted operating parameter is received by the antenna 26 and is made available to the processing device 27. The latter demodulates the reception signal and optionally discards data which have been received from other sensor devices which have a different item of identification information. The reception signal, that is to say the instantaneous acceleration or the instantaneous speed, is then converted into an analog signal. This signal is phase-shifted by a phase shifter 28 and is then supplied to a coil driver 29 which provides a current signal for energizing the coil of the drive device 5.

The control device 6 therefore provides a signal for energizing the coil, which signal corresponds to a phase-shifted acceleration or speed signal. If the oscillation of the oscillating conveyor 1 is approximately considered to be a harmonic oscillation, resonance of the oscillation of the oscillating rail 2 is present when driving is effected with a signal which has been phase-shifted through 90° with respect to an instantaneous location of the oscillating rail. However, a speed or an acceleration which is recorded by the sensor device 8 has been phase-shifted through 90° or 180° with respect to a location of the oscillating rail 2 during a harmonic oscillation. As a result of a corresponding phase shift by the phase shifting device 28, a control signal for resonant driving of the oscillating conveyor 1 can therefore be generated from an acceleration or speed signal. In this case, the oscillating conveyor 1 is self-excited.

In order to make it possible to automatically start the oscillating conveyor 1, a starter 30 is additionally provided in the control unit 6, the output signal from which starter is added to the output signal from the phase shifter. The latter can provide, for example, a pulse signal in order to generate initial excitation for the oscillating conveyor 1.

In alternative embodiments of the control device 6, it is possible to carry out the processing in the control device 6 in a largely digital manner by means of a digital circuit, a microprocessor or the like. In this case, after the reception signal has been demodulated by the processing device 27, no digital/analog conversion is initially carried out, but rather the reception signal is digitally processed further. In this case, the digital/analog conversion can optionally be carried out after the signal has been phase-shifted, after the excitation signal has been added or only when a control current is provided in the coil driver 29.

FIG. 8 shows the control device 6 of an alternative exemplary embodiment of the oscillating conveyor 1. The reception of the operating parameter by the antenna 26 and the processing device 27 and the control of the coil 5 by the coil driver 29 are carried out in the manner explained with respect to FIG. 7. However, the provision of a control signal for the coil driver 29 on the basis of the operating parameter is carried out in the case of FIG. 8 using a control loop explained below. A second processing device 31 can generate variables derived from the operating parameter. If, for example, a temporal profile of an acceleration is transmitted as the operating parameter, the second processing device 31 can calculate a frequency, an amplitude and/or a phase of the oscillation from this temporal profile. The second processing device 31 therefore provides a derived operating parameter which is calculated from the operating parameter. Alternatively, it would be possible for an amplitude, a phase and/or a frequency to be directly transmitted as the operating parameter. In this case, preprocessing by the second processing device 31 would be unnecessary and the control device 6 could be designed without the processing device 31. A desired value 32 corresponding to a value to which the operating parameter or the derived operating parameter is intended to be regulated is subtracted from the derived operating parameter or from the operating parameter. The difference signal is then supplied to a control element 33, for example a proportional-integral element. The latter controls an oscillation generator 34 which generates a control signal which is supplied to the coil via the coil driver 29.

For example, the oscillation generator 34 generates a sinusoidal signal, the amplitude, phase and/or frequency of which is/are adapted by the controller 33. The phase, the amplitude and/or the frequency at which the oscillating rail 2 oscillates can be set to a defined value by specifying corresponding desired values 32. The phase may be, in particular, a relative phase between the control signal for the coil of the drive device 5 and the temporal profile of the operating parameter. Resonant operation of the oscillating conveyor 1 can be achieved with the control device 6 illustrated in FIG. 8, for example, by predefining a phase angle of 90° between the mechanical oscillation of the oscillating rail 2 and the energization signal for the coil.

While specific embodiments of the invention have been shown and described in detail to illustrate the inventive principles, it will be understood that the invention may be embodied otherwise without departing from such principles.

We claim:

1. A sensor device which is used to provide a control device with at least one operating parameter of an oscillating conveyor, the control device being used to control a drive device for exciting oscillation of an oscillating rail on the basis of the operating parameter, the sensor device comprising:

at least one sensor element for obtaining at least one measured value from which the operating parameter can be determined, the operating parameter describing a phase of an oscillation of the oscillating rail, or a temporal profile of the measured value for a predefined interval of time, or a temporal profile of the measured value for an interval of time determined from measured values, or a temporal profile of a value determined from the measured value for a predefined interval of time, or a temporal profile of a value determined from the measured value for an interval of time determined from measured values;

at least one communication device for wirelessly transmitting the determined operating parameter to the control device;

a processing device for determining the operating parameter from the measured value, the processing device being designed to control the communication device to transmit to the control device the determined operating parameter at predefined intervals or at intervals dependent on the measured value; and an energy supply device for supplying the sensor device with operating energy, the energy supply device being used to convert a vibration generated by the drive device and/or electromagnetic radiation into the operating energy.

2. The sensor device according to claim 1, wherein the energy supply device comprises an oscillating element, which can be caused to oscillate by means of vibration in the event of mechanical contact between the sensor device and the oscillating conveyor, and a rectifying circuit, an AC voltage being provided when the oscillating element oscillates, and the rectifying circuit being used to provide the operating energy by rectifying the AC voltage.

3. The sensor device according to claim 2, wherein the oscillating element is a piezoelectric element or comprises at least one piezoelectric element, the piezoelectric element being deformed when the oscillating element oscillates.

4. The sensor device according to claim 3, wherein the piezoelectric element couples a counterweight, which is movable in at least one direction with respect to the sensor device, to a fastening point which is stationary with respect to the sensor device.

5. The sensor device according to claim 2, wherein the oscillating element is a bending transducer.

6. The sensor device according to claim 2, wherein the oscillating element comprises a permanent magnet which is movably mounted with respect to a coil, the AC voltage being dropped across the coil when the permanent magnet oscillates.

7. The sensor device according to claim 1, wherein the energy supply device comprises a receiving antenna for the electromagnetic radiation and a rectifying circuit for providing the operating energy from a reception signal from the receiving antenna.

8. The sensor device according to claim 1, wherein the operating parameter is the phase of an oscillation of the oscillating rail.

9. The sensor device according to claim 1, wherein the sensor device comprises at least one converter device for subjecting the measured value or the operating parameter to analog/digital conversion, the communication device being designed to digitally transmit the operating parameter.

10. An oscillating conveyor comprising an oscillating rail, a drive device for exciting an oscillation of the oscillating rail and a control device for controlling the drive device, wherein the oscillating conveyor comprises a sensor device according to claim 1, the control device being used to control the drive device on the basis of the operating parameter wirelessly transmitted by the sensor device.

11. The oscillating conveyor according to claim 10, wherein the operating parameter relates to the phase of the oscillation of the oscillating rail, the sensor device, the control device and the drive device forming a control loop for regulating the phase and/or the amplitude and/or the frequency of the oscillation to a predefined value.

12. The oscillating conveyor according to claim 10, wherein the control device is designed to provide the operating parameter as a control signal for the drive device with a predefined time delay.

13. The oscillating conveyor according to claim 10, wherein the drive device comprises at least one coil, an armature being arranged on the oscillating rail, which armature is attracted by the coil when the coil is energized, the control device being designed to energize the coil on the basis of the operating parameter.

* * * * *